(12) United States Patent
Burban et al.

(10) Patent No.: US 7,266,950 B2
(45) Date of Patent: Sep. 11, 2007

(54) INSTALLATION FOR DELIVERING A FROZEN PRODUCT AND METHOD FOR USING SAME

(75) Inventors: Damien Burban, Guyancourt (FR); Cédric Chastel, Lyons (FR); Luc Gaffet, St Quentin les Trôo (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 74 days.

(21) Appl. No.: 10/505,037

(22) PCT Filed: Feb. 18, 2003

(86) PCT No.: PCT/FR03/00528

§ 371 (c)(1),
(2), (4) Date: Apr. 1, 2005

(87) PCT Pub. No.: WO03/000071

PCT Pub. Date: Aug. 28, 2003

(65) Prior Publication Data

US 2005/0166606 A1 Aug. 4, 2005

(30) Foreign Application Priority Data

Feb. 20, 2002 (FR) .................................. 02 02139

(51) Int. Cl.
*F25D 13/00* (2006.01)
(52) U.S. Cl. ................................ 62/62; 62/63; 62/378
(58) Field of Classification Search ................ 62/62, 62/342–343, 63, 378–382
See application file for complete search history.

(56) References Cited

U.S. PATENT DOCUMENTS 4,314,451 A * 2/1982 Leeds et al. .................... 62/68
5,220,802 A * 6/1993 Kiczek et al. .................. 62/63
5,319,946 A * 6/1994 Manificat ..................... 63/342
5,732,559 A * 3/1998 Horn et al. ..................... 62/62

(Continued)

FOREIGN PATENT DOCUMENTS

GB 2 022 230 12/1979

(Continued)

OTHER PUBLICATIONS

International Search Report for PCT/FR 03/00528.

(Continued)

*Primary Examiner*—William E. Tapolcai
(74) *Attorney, Agent, or Firm*—Elwood L. Haynes

(57) ABSTRACT

The invention concerns a method for using an installation for delivering a frozen product comprising a feed line connected to a storage container or to an installation producing said frozen product. Prior to introducing said product into said feed line or during an interruption in the operation of said installation, a cold fluid is circulated in said feed line bringing the feed line to a temperature capable of maintaining said product frozen during its stay in said feed line or of maintaining said channel at said temperature. The invention also concerns an installation for delivering a frozen product and a delivery feed line. It comprises means for circulating a cold fluid in said feed line from a point located proximate to one of its ends. The invention is applicable to the food industry.

5 Claims, 1 Drawing Sheet

U.S. PATENT DOCUMENTS 6,170,269 B1 * 1/2001 Wisniewski .................... 62/63

FOREIGN PATENT DOCUMENTS

WO    WO 01 40088 A1    6/2001
WO    WO 03 071203 A1    8/2003

OTHER PUBLICATIONS

Patent Abstracts of Japan, publication No. 2000065452, publication date Mar. 3, 2000, application date Aug. 21, 1998, application No. 10234346; and JP 2000 65452, Mar. 3, 2003.

* cited by examiner

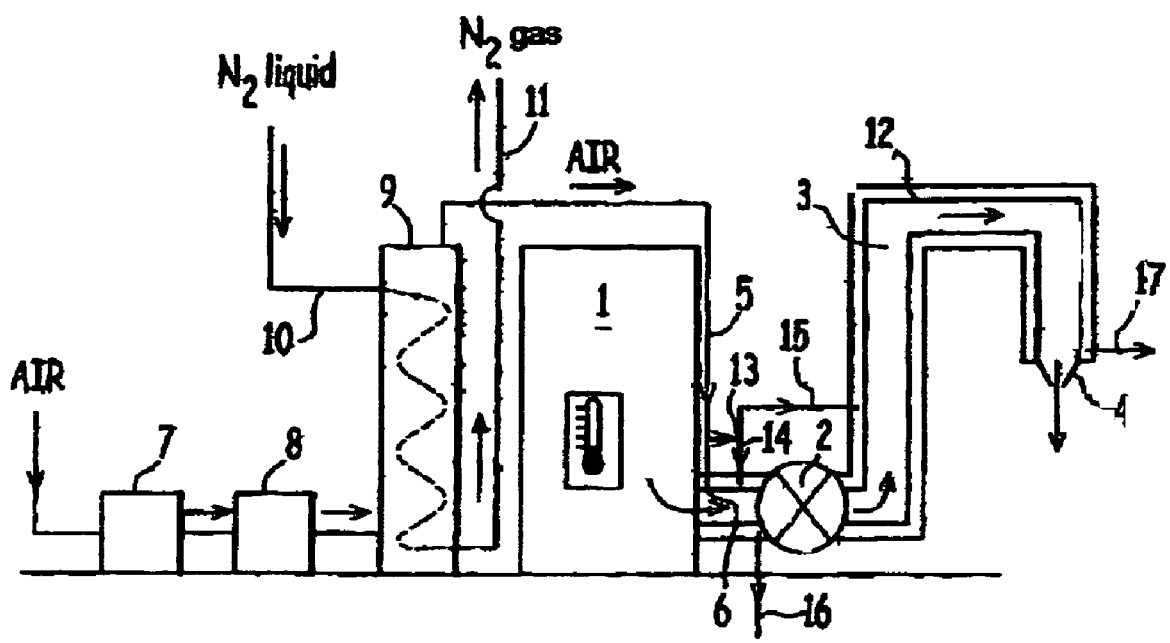

INSTALLATION FOR DELIVERING A FROZEN PRODUCT AND METHOD FOR USING SAME

BACKGROUND

The invention concerns the field of the transport of cold products in ducting, in particular in the field of foodstuffs.

In various industries, in particular the food industry, which will be taken as a preferred but not exclusive example in the rest of the description, there is a need to transport frozen products through ducting so as to deliver them to a treatment or storage site (including sites where wrapping or packaging operations are carried out). These frozen products can be in viscous form or in the form of a divided solid. As a product in a viscous form, mention may be made of soups. As products in a divided solid form, mention may be made of peas and other vegetables.

These transport installations generally operate in a manner that is as continuous as possible. Nevertheless, it is inevitable that their operation experiences transient periods: stopping and restarting of production, or a product change when the same transport installation is connected to several installations for the production or storage of different products. During these transient periods, the ducting becomes heated and with it the product that may be located in it. This heating of the product can thaw it and therefore render it unusable. When production starts again this product must then be rejected, with all the economical disadvantages that this entails.

In the case where no product is located in the ducting, in particular at the moment when the installation starts, the first quantities of product passing through the ducting are heated by contact with it and, in this way, can become unusable. They will have served only to bring the ducting to its normal working temperature. Moreover, since loss of the product has served to cool the ducting, the disadvantages of this procedure are an increase in rejects from the installation that have to be retreated, and the risk of fouling and contamination of the ducting by fractions of thawed product that would remain therein, with all the problems of hygiene that this can entail. It will thus be seen that this simple solution to be implemented to bring the ducting to its working temperature is however unsatisfactory from an economical point of view and from a technical point of view.

Another possible solution is to provide so-called "jacket" ducting and to circulate a cooling liquid such as ammonia at about −35° C. around the ducting for transporting the product, at least during periods when production is interrupted. This solution nevertheless presents technical problems. It makes the ducting more complex, which complicates disconnection and reconnection operations during cleaning and replacements that have to take place regularly, in particular when ducting with different diameters has to be used according to the nature of the transported products. In addition, it is not possible to cool the mechanical elements of the installation in this way such as pumps or other devices ensuring progression of the product and to which the different sections of the ducting are connected. Now, passage through these mechanical elements that are not yet cold is often responsible for the major part of product heating. The fact should also be pointed out that the product itself will in this way bring about soiling of these mechanical elements.

The object of the invention is to provide a satisfactory solution, both from the technical point of view as well as from the economical point of view, to the problem of the reheating of frozen products during transient periods, as has just been described.

SUMMARY

To this end, the object of the invention is a method for using an installation for delivering a frozen product comprising delivery ducting connected at its upstream end to a storage vessel or to an installation for producing said frozen product, characterized in that, prior to introducing said product into said ducting or during an interruption to the operation of said delivery installation, a cold fluid is passed through all or part of said ducting so as to bring said ducting to a temperature compatible with maintaining said product in a frozen form while it remains in said ducting, or to maintain said ducting at said temperature.

BRIEF DESCRIPTION OF THE DRAWING

For a further understanding of the nature and objects for the present invention, reference should be made to the following detailed description, taken in conjunction with the accompanying drawing, in which like elements are given the same or analogous reference numbers and wherein:

FIG. 1 illustrates an embodiment of the invention.

DESCRIPTION OF PREFERRED EMBODIMENTS

The invention is a method for using an installation for delivering a frozen product comprising delivery ducting connected at its upstream end to a storage vessel or to an installation for producing said frozen product, characterized in that, prior to introducing said product into said ducting or during an interruption to the operation of said delivery installation, a cold fluid is passed through all or part of said ducting so as to bring said ducting to a temperature compatible with maintaining said product in a frozen form while it remains in said ducting, or to maintain said ducting at said temperature.

Said cold fluid can also be circulated around said ducting.

Said cold fluid is, for example, refrigerated compressed air.

The object of the invention is also an installation for delivering a frozen product of the type comprising a storage vessel or an installation for producing said frozen product and delivery ducting that is connected thereto at its upstream end, characterized in that it includes means for passing a cold fluid through said ducting from at least one point on the ducting (preferably situated close to one of its ends) so as to carry out concurrent or countercurrent sweeping thereof in the direction of the passage of the product through the ducting.

Said ducting can be equipped with a jacket and it includes means for circulating said cold fluid or another cold fluid also inside said jacket.

As will have been understood, the invention consists of bringing the ducting to or maintaining the ducting at a temperature compatible with maintaining the product in a frozen form before starting or restarting operation of the transport installation, by means of circulating a liquid or gaseous cold fluid inside the ducting itself.

The invention will be better understood on reading the following description, given with reference to FIG. 1 which shows diagrammatically an example of an installation for transporting a cold product according to the invention.

The example of the installation according to the invention of FIG. 1 includes, in a known manner, a refrigerated container 1 where a product, for example a food product, is stored in frozen form. This product can be in a viscous state, or can be in a divided solid form. It must be capable of being extracted from the refrigerated container 1 by means such as a pump 2 placed on the path of ducting 3 connected by its upstream end to the refrigerated container 1. The downstream end 4 of the ducting 3 emerges to the outside environment so as to deliver the product, for example to a packaging line or to any other installation providing treatment of the product. The product can also, of course, be delivered directly to the final user.

According to the invention, the installation includes apparatuses making it possible to pass a cold fluid through the ducting 3 itself when the installation is started or restarted. To this end, in the example shown, this fluid consists of compressed air previously cooled by liquid nitrogen. This compressed air passes through a conduit 5 emerging in the ducting 3 for transferring the product at a point 6 situated as close as possible to its upstream end, therefore to the outlet of the refrigerated container 1. Various conventional apparatuses for treating and cooling compressed air are situated on the path of the conduit 5. For example, filters 7 exist there for removing chemical and microbial pollutants from the compressed air, as well as a dryer 8 for removing its water vapour, and a cooler 9. In this cooler 9, the compressed air, initially at a temperature close to ambient temperature, is cooled to a temperature of the order of the temperature at which the product to be transported through the ducting 3 must be delivered. In the example shown, this cooling is carried out by heat exchanges with nitrogen entering the cooler 9 in liquid form through a conduit 10 coming from a cryogenic installation (not shown) and leaving again in gaseous form through a conduit 11.

Circulating this refrigerated air through the ducting 3 before starting to introduce the frozen product to be transferred has many advantages compared with the prior practices consisting of providing cooling of the ducting 3 by the product itself or by a fluid circulating in a jacket:
- the cooling time is reduced;
- the transfer installation is cooled completely, including its mechanical elements;
- it is easy to modulate the injected refrigerated air flow and its temperature according to the desired temperature for the ducting 3;
- it is not necessary to equip the ducting 3 with a jacket with all the complications that involves during assembly and dismantling;
- there is no loss of product or risk of contamination of the ducting 3 by the product that would have passed through it at too high a temperature, nor is there any production of rejects to be treated.

Moreover, it is easy to adapt an already existing production installation to the use of this method.

It can also be envisaged, when the product present in the ducting 3 does not completely fill this (in particular if the product is a solid in divided form), also to circulate the refrigerated air through the conduit 3 during periods of interruption of the operation of the installation while the product is still in the ducting 3. In this way, it is possible to maintain the ducting 3 and the product that it encloses, permanently at a temperature compatible with maintaining the frozen state of the product.

Moreover, in the example of the installation shown in FIG. 1, the ducting 3 has been equipped with a jacket 12. Conduits 13, 14, 15 make it possible to introduce cooled compressed air coming from the conduit 5 also inside the jacket 12 of the ducting 3 in its different sections, and conduits 15, 17 make it possible to remove this air after it has been passed through the different sections of the ducting 3. In this way, it is possible to maintain the ducting 3 and the product existing therein at a low temperature even when the product fills all the inner space of the ducting 3, 50 that circulation of cold air therein is not possible. This of course assumes that the technological disadvantages inherent in the use of ducting 3 with a jacket, referred to above, are accepted.

The use of cooled compressed air also in the jacket has been mentioned above but, without departing from the scope of the present invention, it would of course be possible to circulate another cold fluid therein different from that used in the ducting itself (for example ammonia).

This circulation of cold air can be carried out concurrently with respect to the circulation of frozen product (as shown) or countercurrently with respect to the circulation of frozen product.

It is evident that the refrigerated container 1 can either be a simple storage container for the frozen product to be delivered, or for example an installation for producing this product.

The use of refrigerated compressed air is only a preferred example and it would be possible similarly, and still as an illustration, to use other fluids such as nitrogen or $CO_2$ in liquid or refrigerated gaseous form.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for delivering a frozen product with an installation comprising:
   a) connecting delivery ducting at its upstream end to a storage means for a frozen product;
   b) passing a cold fluid through at least part of said ducting at a time selected from the group consisting of prior to introducing said product into said ducting and during an interruption to the operation of said introducing so as to reduce the temperature of said ducting to a temperature suitable for maintaining said product in a frozen state while said product remains in said ducting, or to maintain said ducting at said temperature.

2. The method of claim 1, wherein said fluid is also circulated around said ducting in a jacketed structure.

3. The method of claim 1, wherein a second fluid is circulated around said ducting in a jacketed structure.

4. The method of claim 1, wherein said cold fluid comprises at least one member selected from the group consisting of
   a) air;
   b) nitrogen; and
   c) carbon dioxide.

5. The method of claim 4, wherein said cold fluid comprises refrigerated compressed air.

* * * * *